United States Patent [19]
Parvulescu et al.

[11] Patent Number: 5,867,457
[45] Date of Patent: Feb. 2, 1999

[54] MUSIC COMPACT DISK PLAYER

[75] Inventors: Adrian Parvulescu, Fish Eddy, N.Y.; John M. Van Ryzin, Madison, N.J.

[73] Assignees: Sony Corporation, Tokyo, Japan; Sony Electronics Inc., Park Ridge, N.J.

[21] Appl. No.: 843,252

[22] Filed: Apr. 14, 1997

[51] Int. Cl.[6] .................................................. G11B 17/22
[52] U.S. Cl. ............................................................. 369/33
[58] Field of Search .................................. 369/33, 32, 30, 369/34, 47, 48, 54, 58

[56] References Cited

U.S. PATENT DOCUMENTS

| | | | |
|---|---|---|---|
| 5,245,600 | 9/1993 | Yamauchi et al. | 369/49 |
| 5,446,714 | 8/1995 | Yoshio et al. | 369/32 |
| 5,617,407 | 4/1997 | Bareis | 369/275.3 |

*Primary Examiner*—Tan Dinh
*Attorney, Agent, or Firm*—Frommer Lawrence & Haug, LLP; William S. Frommer

[57] ABSTRACT

Music compact disk player which automatically programs the titles and song names of every music CD that is installed therein. In addition to installing a multiple number of music CDs, a data CD having stored thereon time code data and name data of most or all music CDs is installed into the music compact disk player. Respective time code data, representing the number of songs and the song lengths thereon, is reproduced from each installed music CD, and respective name data corresponding to the reproduced time code data are reproduced from the data CD. The reproduced name data, which identifies the title and song names of every installed music CD, are stored in the music compact disk player's memory.

18 Claims, 2 Drawing Sheets

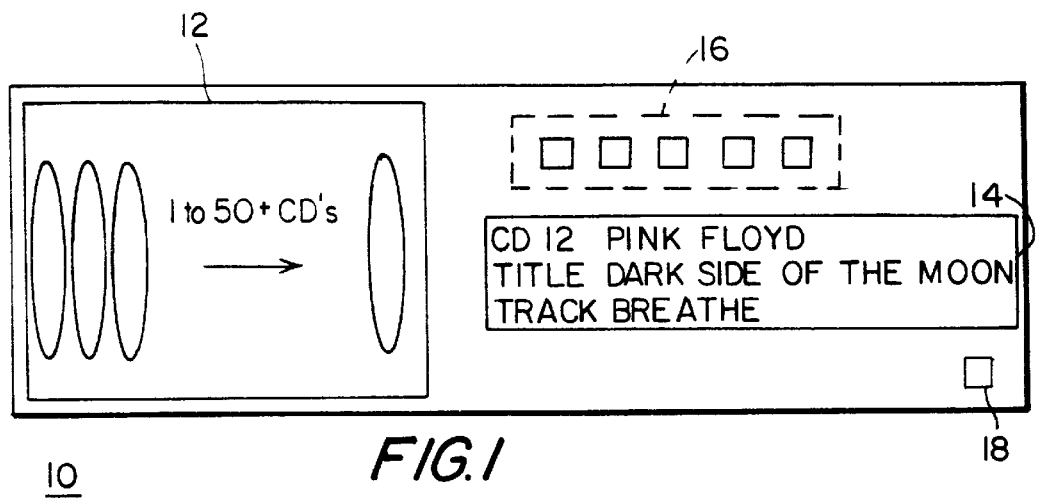
FIG. 1
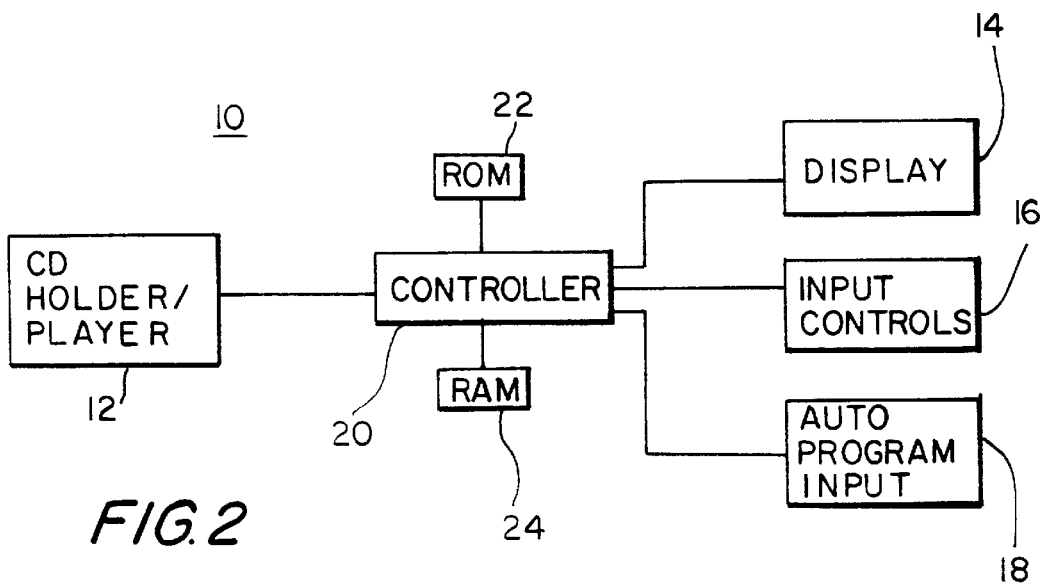
FIG. 2
| NUMBER OF SONGS | SONG LENGTHS | TITLE | SONG NAMES |
|---|---|---|---|
| 11 | [3:34] [4:47] [4:02] [5:21]... | ELTON JOHN GREATEST HITS | YOUR SONG, DANIEL... |
| 13 | [4:24] [5:02] [5:21] [3:02]... | JOHN LENNON ROCK 'N' ROLL | BE-BOP-LULA, STAND BY ME.... |
| | | | |
FIG. 3

MUSIC COMPACT DISK PLAYER

BACKGROUND OF THE INVENTION

The present invention relates to a music compact disk player and, more particularly, to a multi-CD music compact disk player which automatically identifies and stores therein the title and song names of every installed music CD.

As is known, music compact disks (CDs) are reproduced in music CD players, such players being able to have installed therein a variety of numbers (e.g., 1, 2, 3, 5, 10, 50, 100, etc.) of music CDs. Due to the possibly large number (e.g., 50) of music CDs that may be installed in a CD player, these devices often allow the user to manually program (i.e., enter) the title and song names of each installed music CD. One problem, however, with such manual programming is that the data entry process of supplying the title and song names of every installed music CD is tedious and exhaustive, and such often must be performed without the use of a 26 letter keyboard.

New music CDs, which are planned to be introduced into the marketplace, have a different data format than that of currently existing music CDs and include data thereon that identify the respective CD's title and track (i.e., song) names. It is anticipated that new music CD players will automatically retrieve the title and song names of installed CDs simply by accessing the CDs themselves thus obviating the need to manually enter such information.

However, even with the introduction of new music CDs having the new data format, the title and song names of currently available music CDs which have the current data format that are installed in a music CD player still must be manually entered by the user to "program" the music CD player.

OBJECTS OF THE INVENTION

Therefore, it is an object of the present invention to provide a music compact disk player and method for programming the same which overcome the shortcomings of existing devices.

Another object of the present invention is to provide a music compact disk player which identifies automatically the title and song names of each music CD installed therein.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, music compact disk player and method for programming a music compact disk player are provided for installing at least one music CD and one data CD into the music compact disk player, the data CD having stored thereon time code data (i.e., number of songs and lengths of the songs) and name data (i.e., title name and song names) of a plurality of music CDs, reproducing the time code data from each installed music CD, reproducing from the data CD the name data that corresponds to the reproduced time code data, and storing the reproduced name data in the music compact disk player's memory.

As one aspect of the present invention, the data CD is provided with a unique header data distinguishing it from music CDs, the header data of each installed CD is reproduced until the unique header data is reproduced, and the installed CD that has the unique header data is identified as the data CD.

As another aspect of the present invention, a plurality of music CDs are installed into the music compact disk player, respective time code data is reproduced from each of the installed music CDs, respective name data corresponding to the respective time code data of each of the installed music CDs are reproduced from the data CD, and the reproduced name data corresponding to each of the installed music CDs are stored in the music compact disk player's memory.

As a further aspect of the present invention, graphic images corresponding to the reproduced time code data are reproduced from the data CD.

As yet another aspect of the present invention, lyric data representing the lyrics of installed music CDs are reproduced from the data CD.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 1 is a schematic illustration of a music compact disk player in accordance with the present invention;

FIG. 2 is a block diagram of the music compact disk player of the present invention;

FIG. 3 schematically illustrates the data structure of a data CD used by the present invention.

DETAILED DESCRIPTION OF CERTAIN PREFERRED EMBODIMENTS

Figure 4:
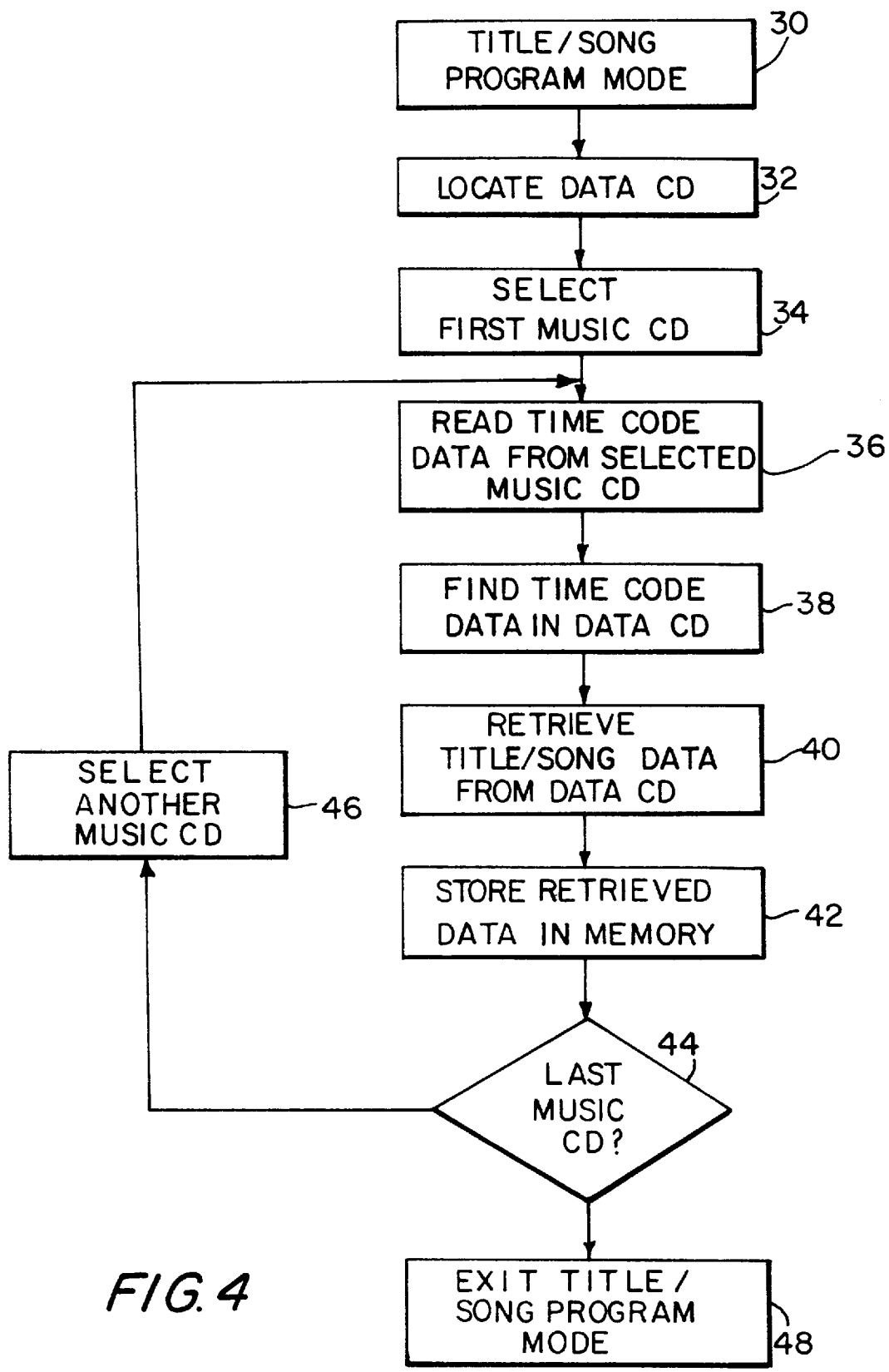
FIG. 4 is a flowchart of the operation of automatically programming the music compact disk player in accordance with the present invention.

Referring now to the drawings, FIG. 1 is a schematic illustration of the music compact disk player 10 of the present invention. Music compact disk player 10 is comprised of a multiple CD holder 12, a display 14, input buttons 16 and an auto program key 18. Music compact disk player 10 may further include any other suitable device including, for example, audio output terminals, graphic equalizer controls, CD eject button, etc., but since such devices form no part of the present invention, a discussion thereof is omitted herein. CD holder 12 is adapted to hold a multiple number of CDs and has any construction that is known in the art. Input buttons 16 and display 14 similarly may be of any construction that is known in the art. Since the specific operations of CD holder 12, display 14 and input buttons 16 are well-known in the art, a discussion of the operation thereof is omitted herein except where necessary for an understanding of the present invention.

The auto program key 18 is adapted to enable the user to control music CD player 10 to enter an "auto program" mode (also identified herein as the "title/song program" mode) in which music CD player 10 is programmed to identify automatically the title and song names of every music CD installed therein, as will be discussed. Auto program key 18 may be a switch, a push button or any other known input device. Referring next to FIG. 2, a block diagram of music CD player 10 is shown as further including a controller 20 (e.g., a CPU), a read-only memory (ROM) 22 and a random access memory (RAM) 24.

Like standard music CD players, a number of music CDs are installed in music CD player 10 of the present invention. In addition, a "data CD" is installed in music CD player 10 which has stored thereon a database that includes the title and song names of every currently available music CD. The data CD further has stored thereon time code information of every music CD, such time code information identifying the number of songs (also referred to as tracks) and the length of each song (e.g., in terms of minutes and seconds) on every music CD.

FIG. 3 is an exemplary data structure of the data CD of the present invention. As shown, a first-listed music CD is identified to have 11 songs thereon, wherein the first song has a length of 3 minutes, 34 seconds, the second song has a length of 4 minutes, 47 seconds, and so on. The title of the first-listed music CD is identified as "Elton John Greatest Hits", the first song of the music CD is identified as "Your Song", the second song of the music CD is identified as "Daniel", and so on. Since there are approximately 200,000 music CDs currently available, and a compact disk can store thereon approximately 650 megabytes of data, a single data CD easily can store thereon the above-identified information of every existing music CD. In an alternative embodiment of the present invention, the data stored on the data CD is compressed thus allowing considerably more data to be stored thereon, as will be discussed.

In accordance with the present invention, a user installs (i.e., inserts) a particular number of music CDs into the CD player of the present invention (in a manner like that of existing CD players), and further installs the data CD into any CD slot of the music CD player. That is, all of the music CDs to be installed and the data CD are placed in any order into holder 12 of music CD player 10 of the present invention. Then, the user may operate the music CD player of the present invention in any manner, including playing, scanning, etc., any of the installed music CDs. In accordance with the present invention, the user depresses auto program key 18 to initiate the player's auto programming routine.

FIG. 4 is a flowchart of the auto programming routine of the present invention. Upon depression of auto program key 18, the music CD player enters a so-called "title/song program" mode, at instruction 30, at which time, the data CD installed in holder 12 is located at instruction 32. As previously mentioned, the data CD has stored thereon the title, the song names, the number of songs and the length of each song of all available music CDs. The data CD further includes a unique header code number that distinguishes it from industry standard music CDs. Thus, the data CD is located, at instruction 32, by identifying that installed CD that includes the unique header code. Upon locating the data CD, the CD title and song names of each installed music CD are retrieved one at a time from the data CD in a manner to be discussed.

One of the installed music CDs (e.g., located in the first slot of holder 12) is selected at instruction 34, and the time code data, including the number of songs and the length of each song, is retrieved from the selected music CD at instruction 36. The retrieved time code data for the selected CD then is found in the data CD at instruction 38 by scanning the data CD until a match is found. That is, music CD player 10 identifies a given music CD by the number of songs thereon and by the length of each of those songs, the cumulation of such information being unique to each music CD. Since the data CD includes such time code data for every existing music CD, and since each music CD is uniquely identified by its time code data (i.e., the number of songs and the song lengths), there is only one match between the selected music CD and the data stored on the data CD. Upon such matching at instruction 38, the title name and song names of the matched CD are retrieved from the data CD at instruction 40 (this data is expanded if it is stored on the data CD in compressed form). The retrieved title and song names of the selected music CD are stored in an appropriate memory of the music CD player, for example, RAM 24, at instruction 42. It is then determined, at inquiry 44, if all of the installed music CDs have been selected, and if not, another music CD is selected at instruction 46, at which time instructions 36–42 are repeated for the next selected music CD to identify and store the title name and song names thereof. Upon determining that all of the music CDs have been selected at inquiry 44, music CD player 10 exits the title/song program mode at instruction 48. At this point, the title and song names of every music CD installed in music CD player 10 are stored in RAM 24 and may be displayed on, for example, display 14 to the user. The user then may select a music CD and song by its name using input buttons 16 in a manner like that of existing devices.

From the foregoing discussion, it is seen that after installing any number of music CDs into music CD player 10 of the present invention, the title and song names of every installed music CD are ascertained by the use of the data CD and by uniquely identifying each installed music CD by its time code information. The user, by means of depressing auto program key 18, may "update" the installed CD list after changing or adding any number of new music CDs into CD player 10.

As an aspect of the present invention, the data CD has stored thereon monochrome or color compressed images (e.g., in JPEG format) corresponding to the CD cover art of every or selected music CDs, whereupon the CD cover art of each installed music CD is retrieved from the data CD at instruction 40 and stored in the music CD player's memory at instruction 42. Supplying the music CD player with a graphics display (not shown) then enables it to display the CD cover art for each installed music CD.

As a further aspect of the present invention, the data CD has stored thereon the song lyrics of selected (or possibly every) music CD, and wherein display 14 (or, alternatively, another display) displays the song lyrics for a selected installed music CD. The song lyrics, as well as the CD cover art, may be stored on the data CD in compressed form.

In an alternative embodiment of the present invention, the above-described time code information, CD titles and song names, as well as any additional data (e.g., the CD cover art and/or music lyrics) are stored in a multiple number (e.g., 2) of data CDs if necessary. In this case, both data CDs are installed with the music CDs in holder 12 of music CD player 10, wherein both data CDs are identified in the manner discussed above. Alternatively, one data CD is installed (with the music CDs), that data CD is identified, and the title and song names for those music CDs with time code data that match the data stored on the installed data CD are retrieved therefrom. Thereafter, the second data CD is installed and the above-discussed process is repeated for all installed music CDs whose title and song names have not yet been identified. Thus, only one data CD needs to be installed at a time to identify the title and song names of each installed music CD.

While the present invention has been particularly shown and described in conjunction with preferred embodiments thereof, it will be readily appreciated by those of ordinary skill in the art that various changes may be made without departing from the spirit and scope of the invention. For example, although the music CD player of the present invention has been described as including an auto program key 18, such a key is not necessary if auto programming can be initiated by means of the standard CD control inputs (e.g., input buttons 16), for example, by means of the use of software driven menus.

As another example, although the present discussion is directed to music CDs, the present invention is not limited solely to compact disks with music stored thereon and may be widely applied to identifying other types of record mediums having music, or any other type of information, stored thereon.

Therefore, it is intended that the appended claims be interpreted as including the embodiments described herein, the alternatives mentioned above, and all equivalents thereto.

What is claimed is:

1. Music compact disk player, comprising:
   means for holding at least one installed music CD and one data CD, said installed music CD having stored thereon music data in a plurality of music tracks and time code data identifying the number of music tracks and a length of each of said music tracks, said data CD containing a database with a plurality of entries, each entry in said database including preselected time code data representing the number of music tracks and the length of each music track in correspondence with name data of a respective music CD;
   CD reproducing means for reproducing data from a selected one of said installed CDs;
   control means for controlling said CD reproducing means to reproduce said time code data from said installed music CD, to reproduce said preselected time code data from said data CD until said time code data reproduced from said installed music CD matches time code data reproduced from said data CD, and to access a corresponding entry in said database on said data CD to reproduce respective name data corresponding to the matched time code; and
   storage means for storing the reproduced name data.

2. The music compact disk player of claim 1, wherein said control means is operable to control said CD reproducing means to reproduce said data CD until the reproduced time code data is found in said data CD and to reproduce from said data CD said name data corresponding to the found reproduced time code data on said data CD.

3. The music compact disk player of claim 1, wherein said data CD includes unique header data distinguishing said data CD from music CDs; and wherein said control means is operable to control said CD reproducing means to reproduce header data from each of said installed CDs until said unique header data is reproduced, and for identifying said installed CD having said unique header data as said data CD.

4. The music compact disk player of claim 1, wherein name data stored on said data CD includes a title of each respective music CD and names of each of the music tracks on said respective music CD; said control means is operable to control said CD reproducing means to reproduce from said data CD the title and music track names of the installed music CD corresponding to the reproduced time code data; and said storage means is operable to store the reproduced title and music track names of the installed music CD.

5. The music compact disk player of claim 1, wherein said means for holding is operable to hold a plurality of installed music CDs and said one data CD, each of said installed music CDs having stored thereon respective music data in a respective number of music tracks and respective time code data identifying the respective number of music tracks and respective lengths of each of said music tracks; and said control means is operable to control said CD reproducing means to reproduce said time code data from each of said installed music CDs, and to reproduce from said data CD respective name data corresponding to the reproduced respective time code data of each said installed music CD.

6. The music compact disk player of claim 5, wherein said storage means is operable to store the reproduced name data corresponding to each of said installed music CDs.

7. The music compact disk player of claim 1, further comprising means for receiving an auto program instruction; and wherein said control means is responsive to receipt of said auto program instruction to control said CD reproducing means to reproduce said time code data from said installed music CD, and to reproduce from said data CD said name data corresponding to the reproduced time code data.

8. The music compact disk player of claim 1, wherein said data CD further has stored thereon image data representing a plurality of graphic images corresponding to a plurality of music CDs; and said control means is operable to control said CD reproducing means to reproduce from said data CD said image data representing a graphic image corresponding to the reproduced time code data.

9. The music compact disk player of claim 1, wherein said data CD further has stored thereon lyric data representing lyrics of a plurality of music CDs; and said control means is operable to control said CD reproducing means to reproduce from said data CD said lyric data of said music CD corresponding to the reproduced time code data.

10. A method of programming a music compact disk player, comprising the steps of:
    installing at least one music CD and one data CD into said music compact disk player, said installed music CD having stored thereon music data in a plurality of music tracks and time code data identifying the number of music tracks and a length of each of said music tracks, said data CD containing a database with a plurality of entries, each entry in said database including preselected time code data representing the number of music tracks and the length of each music track in correspondence with name data of a respective music CD;
    reproducing said time code data from said installed music CD;
    reproducing said preselected time code data from said data CD until said time code data reproduced from said installed music CD matches time code data reproduced from said data CD;
    accessing a corresponding entry in said database on said data CD to reproduce respective name data corresponding to the matched time code; and
    storing the reproduced name data in a memory in said music compact disk player.

11. The method of claim 10, wherein said step of reproducing from said data CD is carried out by finding in said data CD the reproduced time code data; and reproducing from said data CD said name data corresponding to the found reproduced time code data.

12. The method of claim 10, wherein said data CD includes unique header data distinguishing said data CD from music CDs; said method further comprising the steps of reproducing header data from each of said installed CDs until said unique header data is reproduced; and identifying said installed CD having said unique header data as said data CD.

13. The method of claim 10, wherein said name data stored on said data CD includes a title of each respective music CD and names of each of the music tracks on said respective music CD; said step of reproducing from said data CD is carried out by reproducing from said data CD the title and music track names of the installed music CD corresponding to the reproduced time code data; and said step of storing is carried out by storing the reproduced title and music track names of the installed music CD in the memory of the music compact disk player.

14. The method of claim 10, wherein said installing step is carried out by installing a plurality of music CDs and said one data CD into said music compact disk player, each of said installed music CDs having stored thereon respective music data in a respective number of music tracks and respective time code data identifying the respective number of music tracks and respective lengths of each of said music tracks; and said step of reproducing said time code data is carried out by reproducing said time code data from each of said installed music CDs; and said step of reproducing from said data CD is carried out by reproducing from said data CD respective name data corresponding to the reproduced respective time code data of each said installed music CD.

15. The method of claim 14, wherein said step of storing is carried out by storing the reproduced name data corresponding to each of said installed music CDs.

16. The method of claim 10, further comprising the step of receiving an auto program instruction; and both reproducing steps are carried out in response to the receipt of said auto program instruction.

17. The method of claim 10, wherein said data CD further has stored thereon image data representing a plurality of graphic images corresponding to a plurality of music CDs; and said step of reproducing from said data CD is carried out by reproducing from said data CD said image data representing a graphic image corresponding to the reproduced time code data.

18. The method of claim 10, wherein said data CD further has stored thereon lyric data representing lyrics of a plurality of music CDs; and said step of reproducing from said data CD is carried out by reproducing from said data CD said lyric data of said music CD corresponding to the reproduced time code data.

* * * * *